Dec. 15, 1925.
G. COOK
1,566,074
OPERATING MECHANISM FOR DIRIGIBLE HEADLIGHTS
Filed June 15, 1925

WITNESSES
H. T. Walker
W. F. Buckley

INVENTOR
Gustave Cook.
BY
ATTORNEYS

Patented Dec. 15, 1925.

1,566,074

UNITED STATES PATENT OFFICE.

GUSTAVE COOK, OF GILLETT, WISCONSIN.

OPERATING MECHANISM FOR DIRIGIBLE HEADLIGHTS.

Application filed June 15, 1925. Serial No. 37,288.

*To all whom it may concern:*

Be it known that I, GUSTAVE COOK, a citizen of the United States, and resident of Gillett, in the county of Oconto and State of Wisconsin, have invented certain new and useful Improvements in Operating Mechanism for Dirigible Headlights, of which the following is a specification.

This invention relates to an improvement in operating mechanism for dirigible headlights and aims to provide a mechanism of this character which is of simple and durable construction, reliable and effective in operation, and easy and comparatively inexpensive to manufacture, and which imparts in a smooth and easy manner the proper movement to the headlights when the vehicle is steered while taking up within itself the movements occasioned by the flexion of the springs and the movements set up by vibration.

Figure 1:
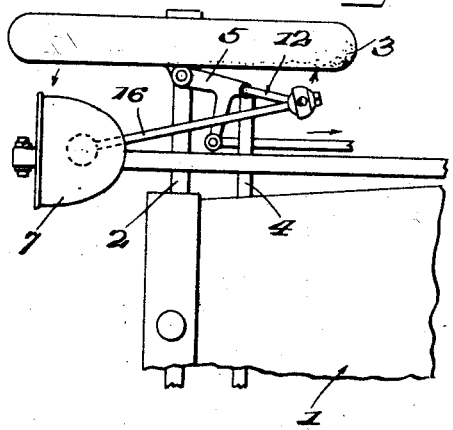
Figure 2:
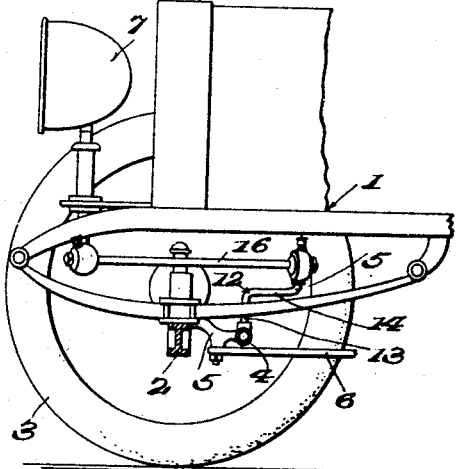
Figure 3:
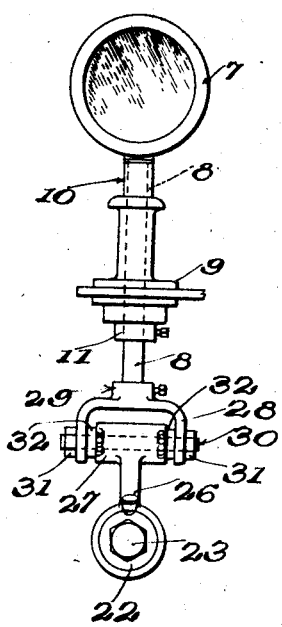
Figure 4:
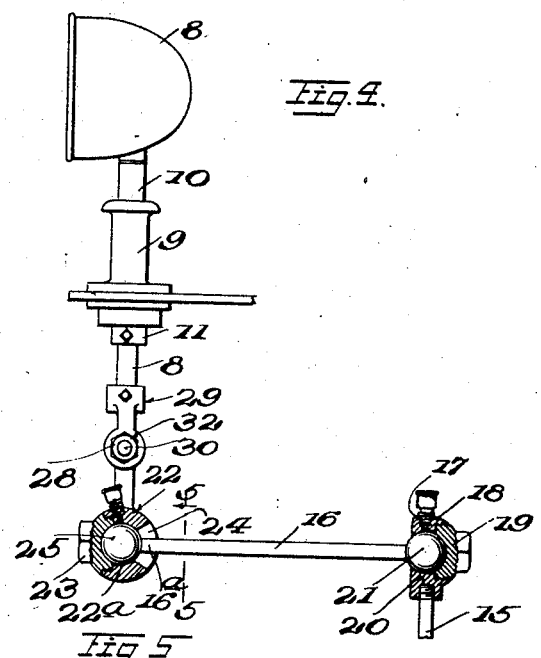
Figure 5:
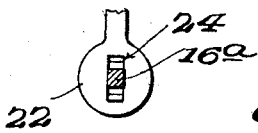

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary plan view showing the mechanism embodying the present invention applied on an automobile, Figure 2 is a fragmentary view in side elevation, Figure 3 is a view in front elevation showing the mechanism associated with one headlight, Figure 4 is a similar view in side elevation, and Figure 5 is a view in section on line 5—5 of Fig. 4.

Referring to the drawings the numeral 1 designates generally an automobile which has a front axle 2 to which the steering wheels are connected in the usual way, one steering wheel 3 being shown. The usual tie rod 4 is provided between the arms 5 which are connected to the steering wheels and the usual drag link or connecting rod 6 connects with one of said arms 5 and is actuated from the steering wheel by the conventional motion transmission means.

The automobile has the usual headlights one of which is shown at 7. Each headlight 7 is fixed to the upper end of a vertical shaft 8 rotatably fitted in a bearing 9 carried by the stationary structure of the vehicle frame or body. Collars 10 and 11 hold the shaft 8 against axial movement while permitting it to rotate.

Operating mechanism is provided between each arm 5 and each shaft 8 for turning the headlights as the vehicle is steered.

Each operating mechanism includes a crank arm 12 integrally formed with or suitably fixed to its arm 5 preferably at the point of the pivotal connection of its arm 5 to the tie rod 4. Each crank arm 12 has a vertical portion 13 connected to its crank arm, a horizontal portion 14 extending from the portion 13 and an offset vertical portion 15 extending up from the portion 13. The portion 15 is offset rearwardly and laterally outward from the shaft 8 and between this portion 15 and the shaft 8 an inclined light operating rod 16 is provided. A ball and socket or universal joint designated generally at 17 is provided between the rear end of the rod 16 and the portion 15 of the crank arm, the joint 17 having a casing 18 provided with a removable plug 19 and defining a socket 20 and also having a ball 21 fixed on the rod 16 and fitted in the socket 20.

Connecting means is provided between the forward end of the rod 16 and the shaft 8 for transmitting the horizontal swinging movement of the rod 16 to the shaft while taking up the backward and forward movement and the up and down motion of the rod 16 which result from the flexion of the springs of the vehicle. This connecting means includes a casing 22 provided with a removable plug 23 and provided with a socket 22$^a$. The casing 22 also has a vertical slot 24 in its rear portion, the side walls of the slot being spaced and parallel. A ball 25 is fixed on the forward end of the rod 16 and is fitted in the socket 23. Adjacent the ball 25 the rod 16 is squared as at 16$^a$ and has its side faces slidably fitted against the vertical and parallel walls of the slot 24. With this arrangement the ball 25 moves freely up and down in the socket 23 but when the rod 16 and ball 25 swing horizontally the squared portion 16$^a$ of the rod engages the slot 24 to swing the casing 22 about a vertical axis.

A pivot arm 26 is provided and has its lower end connected to the casing 22 and has a transverse and horizontally disposed pivot bearing 27 at its upper end. The bearing 27 is alined with pivot openings provided in the arms 28 of a yoke 29 fixed to the lower end of the shaft 8. A pivot bolt 30 is fitted in the alined openings of the bearing and arms and is held in position by nuts 31. Washers 32 are positioned on the bolt 30 between the bearing 27 and the arms 28. The back and forward movement of the rod 16 is taken up by the arm 26 which moves relative to its pivot 27 to absorb this motion but the horizontal swinging movement of the rod 16 which corresponds to the steering movement of the wheels is transmitted to the shaft 8 and to the headlight.

I claim:

1. Operating mechanism adapted to swing dirigible headlights from the swinging arms of the steering gear of automobiles and comprising an inclined rod, a ball and socket joint between the rear end of the rod and a swinging arm of the steering gear, said headlight having a vertical shaft, and means for transmitting the horizontal swinging movement of the rod to the shaft while absorbing the up and down and back and forth movement and comprising a casing having a socket and a vertical slot, a ball fixed on the forward end of the rod and fitted in the socket, the rod having a squared portion fitted in the slot, a pivot arm fixed to the casing and having a transverse bearing at its upper end, a yoke fixed to the shaft of the head light and a horizontal pivot bolt between the arms of the yoke and the bearing.

2. Operating mechanism adapted to swing dirigible headlights from the swinging arms of the steering gear of automobiles and comprising an inclined rod, a universal joint between the rear end of the rod and a swinging arm of the steering gear, said headlight having a vertical shaft, and means for transmitting the horizontal swinging movement of the rod to the shaft while absorbing the up and down and back and forth movement, and comprising a casing having a socket and a vertical slot, a ball fixed to the forward end of the rod and fitted in the socket, the rod having a guide portion fitted in the slot to constrain the casing to rotate when the rod swings horizontally, and a connection between the casing and the shaft having a transverse pivot therein whereby the connection takes up the back and forward movement and yet transmits the rotary movement of the casing to the shaft.

GUSTAVE COOK.